United States Patent
Sharma et al.

(10) Patent No.: US 10,229,155 B2
(45) Date of Patent: Mar. 12, 2019

(54) MULTI-TIERED TARGETED QUERYING

(71) Applicant: Facebook, Inc., Menlo Park, CA (US)

(72) Inventors: Arun Dattaram Sharma, Union City, CA (US); Jianming Wu, Fremont, CA (US); Chunhui Zhu, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 676 days.

(21) Appl. No.: 14/478,290

(22) Filed: Sep. 5, 2014

(65) Prior Publication Data
US 2016/0070749 A1 Mar. 10, 2016

(51) Int. Cl.
*G06F 17/30* (2006.01)

(52) U.S. Cl.
CPC .. *G06F 17/30412* (2013.01); *G06F 17/30631* (2013.01); *G06F 17/30867* (2013.01)

(58) Field of Classification Search
CPC ......... G06F 17/30412; G06F 17/30631; G06F 17/30867
USPC ...................................................... 707/741
See application file for complete search history.

(56) References Cited

U.S. PATENT DOCUMENTS

| | | | |
|---|---|---|---|
| 8,650,188 B1* | 2/2014 | Lee | G06Q 30/0256 707/728 |
| 9,239,883 B2* | 1/2016 | Smyth | G06F 17/30867 |
| 2007/0239716 A1* | 10/2007 | Weininger | G06F 17/30699 |
| 2011/0083167 A1* | 4/2011 | Carpenter | G06F 17/30563 726/4 |
| 2013/0347078 A1* | 12/2013 | Agarwal | H04L 63/00 726/4 |
| 2014/0025493 A1* | 1/2014 | Balakrishnan | G06Q 30/0241 705/14.53 |
| 2014/0081978 A1* | 3/2014 | Fuchs | G06F 17/30598 707/740 |
| 2014/0164171 A1* | 6/2014 | Lu | G06Q 30/0207 705/26.7 |
| 2014/0214890 A1* | 7/2014 | Johnson | G06F 17/30584 707/770 |
| 2016/0012454 A1* | 1/2016 | Newton | G06Q 30/0201 705/7.29 |

* cited by examiner

Primary Examiner — Hicham Skhoun
(74) Attorney, Agent, or Firm — FisherBroyles, LLP

(57) ABSTRACT

Technology is disclosed for a multi-tiered querying system to target queries to systems storing data relevant to the query. A multi-tiered targeted query system comprises at least three tiers: a web tier, an aggregator tier, and a shards tier. Servers at the web tier can be configured to service user data requests and pass them to servers at the aggregator tier. Servers at the aggregator tier can be configured to determine which selected shard servers have the requested information; formulate queries for the selected shard servers; send the queries to the selected shard servers; and aggregate results from the selected shard servers. Servers at the shard tier can be configured to store data, receive queries on that data, and return results for received queries.

20 Claims, 6 Drawing Sheets

MULTI-TIERED TARGETED QUERYING

BACKGROUND

Social networking has become one of the dominant ways people gather information and communicate. As the popularity of social networking has grown, social networking sites have attracted have billions of users.

The information generated by or for these users cannot be efficiently stored by a single machine, and as the number of users grows, this information can become spread across thousands of servers. This distribution of information, known as "fan-out," can cause a single query such as "which users performed action X," to be executed by each of the thousands of servers, which each may or may not house a part of the requested data. Because queries are distributed, various latencies can be experienced.

Furthermore, for any given page within a social networking site, multiple queries may be executed requiring sophisticated server software to search through vast stores of data to gather information relating to hundreds or even thousands of users. At any given time, millions of these page requests can occur contemporaneously, e.g. when users visit pages, or "timelines" of their friends or other users.

Despite this complexity, the transition from one page to the next within a social networking website appears simple to end users, and unless this page retrieval process occurs with no perceptible delays, users may lose patience and simply navigate to a different website. Therefore, it is desirable to efficiently search for information to reduce website delays caused by query latency and fan-out.

DETAILED DESCRIPTION

Figure 1:
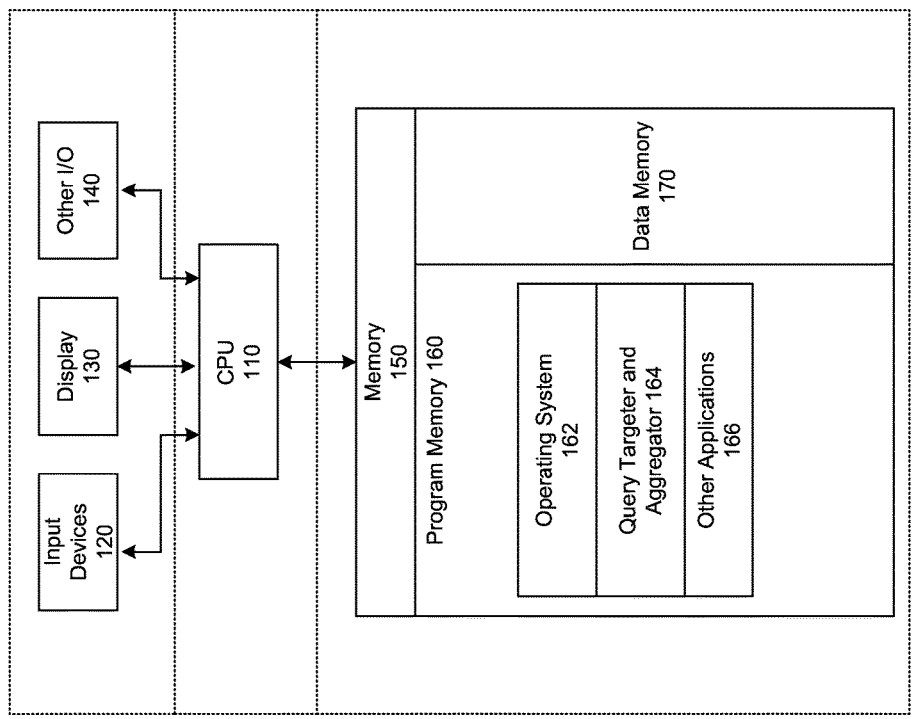
FIG. 1 is a block diagram illustrating an overview of devices on which some embodiments of the disclosed technology can operate.

Technology is disclosed herein for establishing and operating a multi-tiered targeted query system. A multi-tiered targeted query system can organize multiple server computing devices ("servers") into at least three tiers: a web tier, an aggregator tier, and a shards tier. Servers at the web tier can be configured to service user data requests and pass them to servers at the aggregator tier. Servers at the aggregator tier can be configured to determine which selected shard servers have the requested information; formulate queries for the selected shard servers; send the queries to the selected shard servers; and aggregate results from the selected shard servers. Servers at the shard level can be configured to store data, receive queries on that data, and return results for received queries. As used herein, a shard refers to a server or one or more databases stored at a server at the shard tier. In some implementations, a single server can include multiple shards.

Shards can store information for one or more user clusters. For each user in a group of users, a cluster may be formed based on relationships among the users, such as each user being connected as "friends" to a relative high number of other users within their cluster. Each shard is established to include data corresponding to users within the same cluster and each aggregator server is provided with the mapping of users/user data to shards. In some implementations, the data corresponding to the users comprises data about what content items each user has interacted with, such as by performing a "like" operations. In various implementations on in a social media system, other user operations can comprise "commenting on," "sharing," "checking-in with," "subscribing to," "unsubscribing from," "following," "messaging," or "hiding" a content item or other entity in the social media system. In some implementations, an index can be established for each shard indicating, for each user, which content items that user interacted with. In some implementations, an inverse index can be established for each shard indicating, for each content item, which users have performed a particular interaction with that content item.

Operating a multi-tiered targeted query system can include a server at a web tier generating a user data request and transmitting the request to a server at an aggregator tier. The request can specify user activity data, such as the like actions of a particular content item by users within a particular category. For example, the request may be "find all the users who are friends-of-friends of user X who performed a 'like' operation in relation to content item Y." The server at the aggregator tier can respond to the request by consulting a mapping of users to shards to select a subset of the shards that store data for users in the category of users specified in the data request. In some implementations, this may comprise performing a first lookup of the users in the category, such as "get user set Z who are the friends-of-friends of user X" and then performing a second lookup to find the relevant shard systems, such as "select shards that store the 'like' action information for the users in set Z."

The aggregator server can also formulate a query for each of the selected shard systems. In some implementations, this can comprise using the query passed to the aggregator server or generating a generic query to be used by all the selected shard systems. In some implementations, this can comprise generating a different query that is customized for one or more of the selected shard systems. Continuing the above example, the aggregator server can have information indicating that, within user set Z to which the data request relates, the data for users A, B, and C are on shard S. A query can be generated for shard S specifying users A, B, and C, such as "Of users A, B, and C, get the users who performed a 'like' operation in relation to content item Y."

The aggregator server can then transmit the formulated queries to one or more of the selected shards, receive a response from each of the shards, and aggregate the responses into a result set. In some implementations, the data request may be associated with parameters specifying a minimum number (N) and/or percentage (P) of the users in the category. For example, the data request may specify that when at least 100 of user X's friends-of-friends have been identified as liking content item Y and at least 75% of the users who make up user X's friends-of-friends have been identified as liking content item Y, the query can end. In these implementations, queries can be sent to less than all the shards that have data for users in the category. This occurs by ordering the shards based on either a number of users in the category at each shard or by a weighted value for each shard defined by a sum of weights assigned to the users in the category based on the degree to which each user identifies within the category. For example, weights can be determined by an algorithm that estimates how closely a user is friends or friends-of-friends with another user. Such an estimation can be based on factors such as how many friends the users have in common, how much the users interact, the similarity of the content with which the users interact, and data about the user such as geographical and biographical information.

Queries can be sent to one shard at a time or to groups of shards. The groups of shards can be determined based on an expectation value being within a particular threshold level that the query run against that group of shards will satisfy the parameters. In these implementations, transmitting queries to shards, receiving results, and aggregating the results into a result set can be performed incrementally. For example, the aggregator server can initially send queries to five shards based on historical data that indicates sending a query to five shards will satisfy the parameters to find 500 users and 95% of a particular user's friends-of-friends that performed an indicated action. When a result from a shard is received, the aggregator server can aggregate the results with any previously received results from other shards. The aggregator server can check whether the aggregated result set satisfies the parameters, and if not, can cycle through providing the query to additional shards or groups of shards until the aggregated result set satisfies the parameters.

Once a result set is accumulated, either incrementally or from a single burst of one or more queries, the aggregator server can then respond to the server at the web tier by providing the result set.

By grouping data according to user relationships, such as by establishing shards to store clusters of data for users in the same friend groups, and then establishing a middle aggregation tier that limits queries to the shards that store requested data, the number of queries required to fulfill a data request can be greatly decreased. In doing so, the overall user experience for all viewing users may be improved.

Operating a multi-tiered targeted query system may also include the aggregator tier receiving requests for identification of users similar to a given user. For example, the request may be "find the 200 users who are most similar to user X." Because shards can be organized according to user similarity, the requested users will be the 200 users closest to the identified user in the shard storing the data for the identified user. The aggregator server can respond to this request by locating the shard that stores the data for the identified user and generating a query for the users, in that shard, above and below the identified user within a distance equal to one-half the requested number of users. Continuing the previous example, such a query would be "find the 100 users above and the 100 users below user X in the shard for user X." Once the located shard performs this query and returns results to the aggregator server, the aggregator server can respond to the request by providing the results. In doing so, additional functionality is provided that identifies useful information.

Several embodiments of the described technology are discussed below in more detail in reference to the figures. Turning now to the figures, FIG. 1 is a block diagram illustrating an overview of devices 100 on which some embodiments of the disclosed technology may operate. The devices can comprise hardware components of a device 100 for operating a multi-tiered targeted query system. Device 100 includes one or more input devices 120 that provide input to the CPU (processor) 110, notifying it of actions performed by a user. The actions are typically mediated by a hardware controller that interprets the signals received from the input device and communicates the information to the CPU 110 using a communication protocol. Input devices 120 include, for example, a mouse, keyboard, a touchscreen, an infrared sensor, a touchpad, wearable input devices, a camera- or image-based input device, microphone, or other user input devices.

CPU 110 may be a single processing unit or multiple processing units in a device or distributed across multiple devices. CPU 110 can be coupled to other hardware devices, for example, with the use of a BUS, such as a PCI BUS or SCSI BUS. The CPU 110 can communicate with a hardware controller for devices, such as for a display 130. Display 130 can be used to display text and graphics. In some examples, display 130 provides graphical and textual visual feedback to a user. In some implementations, the display includes the input device as part of the display, such as when the input device is a touchscreen or is equipped with an eye direction monitoring system. In some implementations, the display is separate from the input device. Examples of display devices are: an LCD display screen, an LED display screen, a projected display (such as a heads-up display device or a head-mounted device), and so on. Other I/O devices 140 can also be coupled to the processor, such as a network card, video card, audio card, USB, firewire or other external devices, a camera, a printer, speakers, a CD-ROM drive, a DVD drive, disk drives, or Blu-Ray devices.

In some implementations, the device 100 also includes a communication device capable of communicating wirelessly or wire-based with a network node. The communication device can communicate with another device or a server through a network using, for example, TCP/IP protocols. For example, device 100 can utilize the communication device to distribute operations across multiple network devices.

The CPU 110 has access to a memory 150. A memory includes one or more of various hardware devices for volatile and non-volatile storage, and can include both read-only and writable memory. For example, a memory can comprise random access memory (RAM), read-only memory (ROM), writable non-volatile memory, such as flash memory, hard drives, floppy disks, CDs, DVDs, magnetic storage devices, tape drives, device buffers, and so forth. A memory is not a propagating electrical signal divorced from underlying hardware, and is thus non-transitory. The memory 150 includes program memory 160 that stores programs and software, such as an operating system 162, Query Targeter and Aggregator 164, and any other application programs 166. The memory 150 also includes data memory 170 that includes any configuration data, settings, user options and preferences that may be needed by the program memory 160, or any element of the device 100.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

Figure 2:
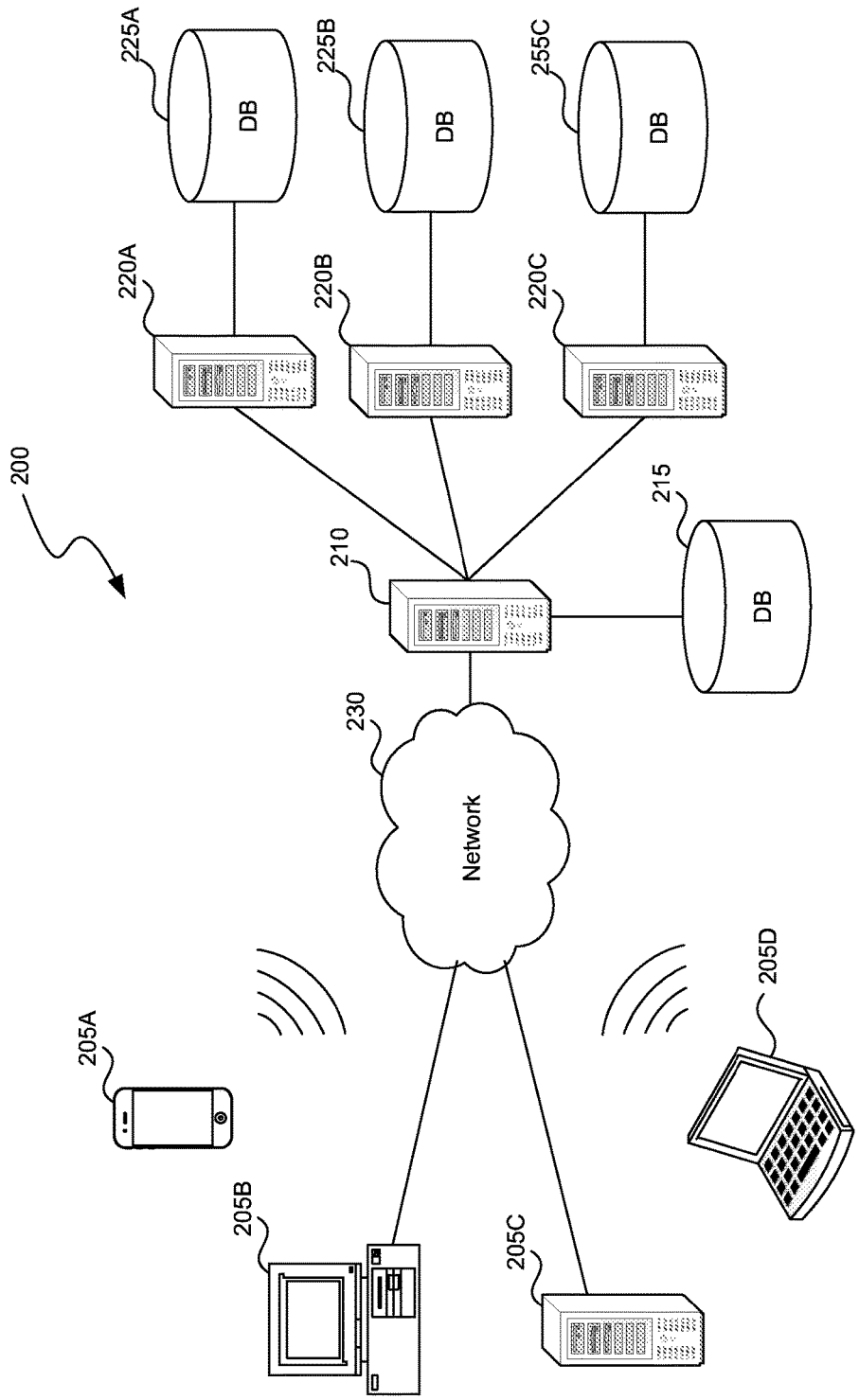
FIG. 2 is a block diagram illustrating an overview of an environment in which some embodiments of the disclosed technology can operate.

FIG. 2 is a block diagram 200 illustrating an overview of an environment in which some embodiments of the disclosed technology may operate. An environment for implementing the technology may include one or more client computing devices 205A-D, examples of which may include device 100. Client computing devices 205 may operate in a networked environment using logical connections to one or more remote computers such as server computing device 210 through network 230.

In some implementations, server 210 may be an edge server which receives client requests and coordinates fulfillment of those requests through other servers, such as servers 220A-C. Server computing devices 210 and 220 may comprise computing systems, such as device 100. Though each server computing device 210 and 220 is displayed logically as a single server, server computing devices can each be a distributed computing environment encompassing multiple machines located at the same or at geographically disparate physical locations. In some implementations, each server 220 corresponds to a group of servers. For example, cluster 220A can have 80 server machines. In some implementations, three of these 80 machines are backup machines, and of the remaining 77 machines, 70 may operate shards for clusters of users. The remaining seven machines may be reserved for new users who have not yet been assigned to a cluster. As users assigned to these seven machines are identified as being in a particular cluster, they can be deleted from the seven new-user machines and added to one of the 70 shard bearing machines in this or another group of servers.

Client computing devices 205 and server computing devices 210 and 220 can each act as a server or client to other server/client devices. Server 210 can connect to a database 215. Database 215 can warehouse information such as user relationships and mappings between users and shards.

Servers 220A-C can each connect to a corresponding database 225A-C. As discussed above, each server 220 may correspond to a group of servers, and each of these servers can share a database or can have their own database. Though databases 215 and 225 are displayed logically as single units, databases 215 and 225 can each be a distributed computing environment encompassing multiple machines, can be located within their corresponding server, and can be located at the same or at geographically dispirit physical locations. Continuing the previous example, each of the 70 databases comprising the servers with shards can operate its own database 225A, and that database can store multiple shards. In some implementations, there can be 200-300 shards per server database 225. Databases 225 can warehouse information such as user profile data and records of actions taken by users. For example, databases 225 can store correspondences between users who performed an interaction, such as a "like" operation, with particular content items. In some implementations, databases are indexed by user-to-content-likes. In some implementations, databases 225 can have an inverse index for content-to-user-likes indicating who performed a "like" operation on that content item; this inverse index can be in addition to or instead of a user-to-content-like index. In some implementations, user data within in each shard of databases 225 can be organized according to similarity of the users.

Network 230 can be a local area network (LAN) or a wide area network (WAN), but can also be other wired or wireless networks. Network 230 may be the internet or some other public or private network. The client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
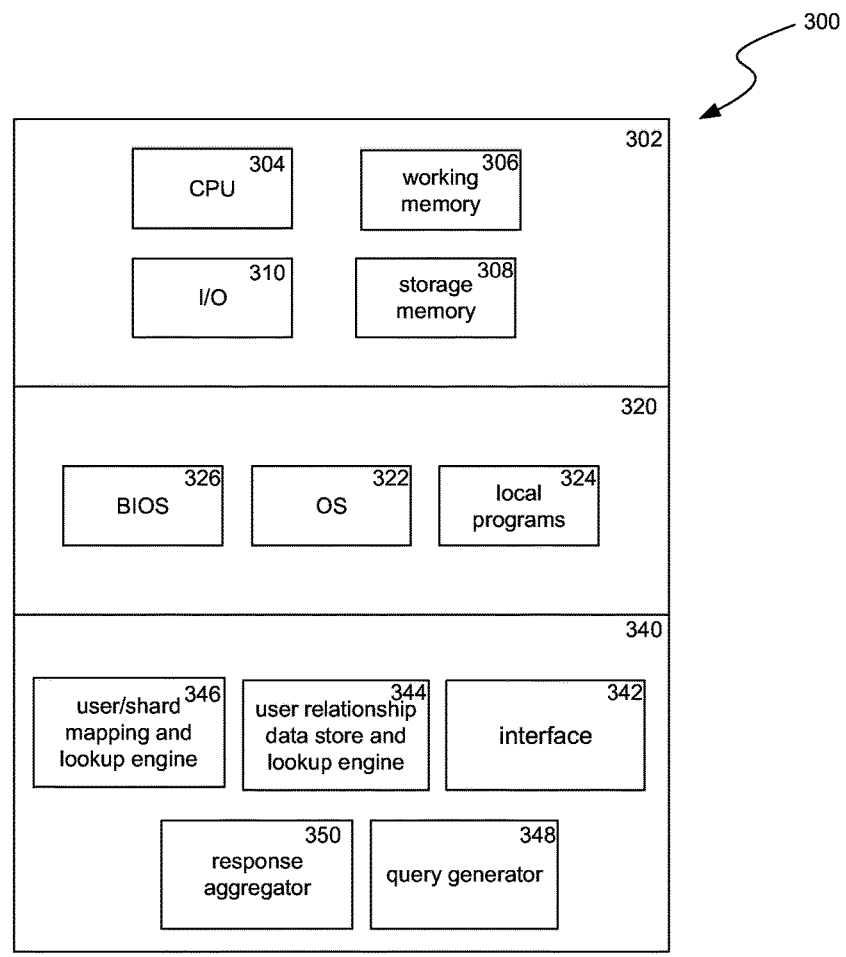
FIG. 3 is a block diagram illustrating components which, in some embodiments, can be used in a system implementing the disclosed technology.

FIG. 3 is a block diagram illustrating components 300 which, in some embodiments, may be used in a system implementing the disclosed technology. The components 300 include hardware 302, general software 320, and specialized components 340. As discussed above, a system implementing the disclosed technology may use various hardware including a central processing unit 304, working memory 306, storage memory 308, and input and output devices 310. Components 300 can be implemented in a client computing device such as client computing devices 205 or on a server computing device, such as server computing device 210 or 220.

General software 320 may include various applications including an operating system 322, local programs 324, and a BIOS 326. Specialized components 340 can be subcomponents of a general software application 320, such as a local program 324. Specialized components 340 can include a user relationship data store and lookup engine 344, a user/shard (user-to-shard) mapping and lookup engine 346, a query generator 348, a response aggregator 350, and components which can be used for controlling and receiving data from the specialized components, such as interface 342.

User relationship data store and lookup engine 344 may be an arranged storage system that holds information about relationships between users, such as which users are friends or are friends-of-friends. User relationship data store and lookup engine 344 can service queries such as "find the users who are friends of user X" and "find the friends or friends-of-friends of user Y," or more generally "find the users who have relationship(s) R to user(s) U." In some implementations, the user relationship data store can house, in addition to the indications of relationships between various users, a weight value indicating an estimate of the strength of that relationship. These weight values can be based on factors such as how many friends the users have in common, how much the users interact, the similarity of the content with which the users interact, and data about the user, such as geographical and biographical information. For example, a weight scale may be 0-1, and a relationship between user X and user Y, where user X is friends with user Y, lives in the same geographical area as user Y, has 20% of the same friends as user Y, and has frequent interactions with user Y, may be assigned a weight of 0.85. Conversely, on the same weight scale, a relationship between user A and user B, where user A and B have a friends relationship but have few other friends or friends-of-friends in common and rarely interact with each other or the same content, may be assigned a weight value of 0.05.

User/shard mapping and lookup engine 346 can be an arranged storage system that holds information about which shard has the information corresponding to particular users. User/shard mapping and lookup engine 346 can service queries such as "find the shard for user(s) X" and "find the machine holding the shard for user(s) Y." In some implementations, results can also be sorted with the shards with the most friends of the identified user appearing first. In some implementations, results can be sorted based on weighted values of user relationships. Each shard can be assigned a value calculated by summing the weighted values for the relationships between the users in a shard and the users identified in the data request. For example, a data request may be for the like operations of friends of user X. User X may be friends with users A, B, and C, whose data is stored by shard S, and user D whose data is stored in shard T. The weighted value for the relationship between X and A may be 0.25, between X and B may be 0.03, and between X and C may be 0.3, thus the sum of 0.58 may be assigned to shard S. The weighted value for the relationship between X and D may be 0.75, thus 0.75 may be assigned to shard T. Because shard T has a higher weight value it can be ordered before shard S.

Query generator 348 can generate queries to send to shards. Query generator 348 can use a received query, can reformulate a received query, or can generate a new query. In some implementations, query generator 348 can generate generic queries that can be passed to multiple shards, such as "find the users on this shard that liked content item X." In some implementations, query generator 348 can generate queries that are specific to a particular shard. For example, query generator 348 can be generating a query to service the data request "find the friends of user U who liked content item C." Query generator 348 can also receive information from user/shard mapping and lookup engine 346 that users J, K, and L are friends of user U and the data for these users are on shard S. Query generator 348 can then generate a query for shard S such as "of users J, K, and L, find the user that liked content item C."

In some implementations, a received data request can specify parameters indicating one or both of a number (N) of users in the identified relationship with the identified user or a percentage (P) of users in the identified relationship with the identified user. In some implementations, these parameters can indicate an amount that is less than all the users in the identified relationship with the identified user who must be checked to complete the data request. As used herein, checking the indicated number or percentage of users is referred to as satisfying that parameter. For example, a data request may request the friends of user X who liked content C, and may indicate an (N)=200 and (P)=50%. A response to the data request can be based on having checked at least 200 of user X's friends for having liked content C and having checked at least 50% of user X's friends for having liked content C.

In some implementations, the (N) and (P) parameters can indicate a minimum number or percentage of users that must be found to satisfy the data request. For example, a data request may request the friends of user X who liked content C, and may indicate an (N)=50. In this case, shards with friends of user X should be queried until either all user X's friends have been checked or at least 50 of user X's friends who liked content C are found. As discussed below in relation to FIG. 5, when either or both of an (N) or (P) is specified and (N) and (P) indicate a minimum number or percentage of users who must be found, queries on various shards can be performed incrementally. In some implementations where both (N) and (P) are specified in the data request, both (N) and (P) must be satisfied to complete the data request. In other implementations where both (N) and (P) are specified in the data request, satisfying either (N) or (P) is sufficient to complete the data request.

In some implementations, where a received data request is to find users similar to an identified user, query generator 348 can generate a query for the shard holding the data for the identified user. This query can indicate the identified user and specify a number of entries to select from that shard database above and below the identified user; this can be a default value or can be based on a value supplied as part of the data request. Selecting users similar to an identified user is discussed in more detail below in relation to FIG. 6.

Response aggregator 350 can receive the results generated from queries sent to one or more shards, either all at once or incrementally, and combine them into a single result set; this result set can be passed through interface 342 to respond to a data request.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc.

Figure 4:
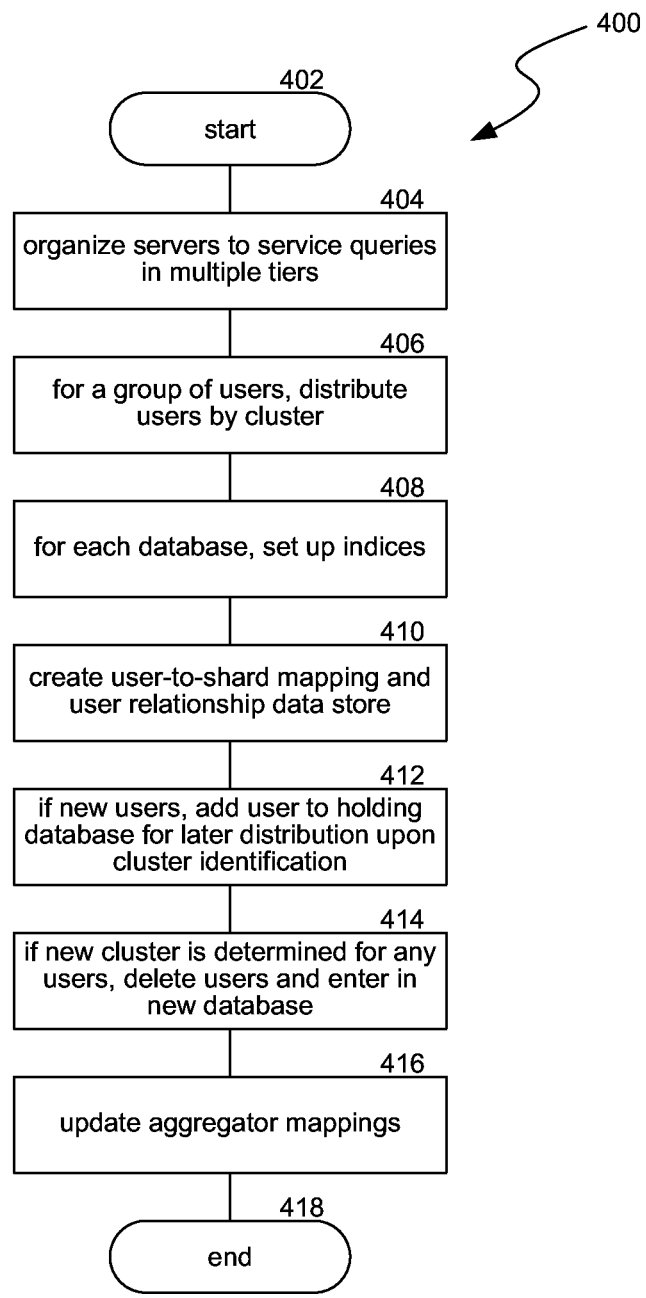
FIG. 4 is a flow diagram illustrating a process used in some embodiments for establishing a multi-tiered targeted system for querying user data.

FIG. 4 is a flow diagram illustrating a process 400 used in some embodiments for establishing a multi-tiered targeted system for querying user data. The process begins at step 402 and continues to step 404. At step 404, servers are organized into three tiers to service queries. These tiers can include a web tier, an aggregator tier, and a shards tier. Servers at the web tier originate data requests which are passed to an aggregator server at the aggregator tier. Aggregator servers at the aggregator tier are configured to receive data requests, formulate queries, and send the queries to selected machines at the shard level. Servers at the shard tier are configured to store information about users and execute queries from the aggregator servers on that stored information. In some implementations, a single machine can perform functions at multiple tiers. For example, a server can perform both aggregator functions, such as receiving data requests and formulating queries, and shard functions, such as storing user data and executing those queries.

Next, at step 406, information relating to users is distributed to shards according to established clusters. A cluster can be a grouping of users that provides a relatively high density of users that share a particular relationship, such as the number of users within the cluster being friends. In some implementations, entries within each shard are further organized according to similarity between users. Similarity between users can be based on factors such as how many friends the users have in common, the similarity of the content with which the users interact, and data about the user, such as geographical and biographical information.

At step 408, one or more indices can be established for each shard. In some implementations, each shard can have a user-to-data index. A user-to-data index can correlate, for each user, what content items that user has performed a particular operations for, such as a "like" operation. In some implementations, each shard can also or instead have an inverse index, such as a data-to-user index. A data-to-user index can correlate, for each content item, which users have performed a particular operation, such as a "like" operation, for that content item.

At step 410, a mapping is created to be stored in each server at the aggregator level. This mapping provides a correspondence between users and the shard that is storing the data for that user. This mapping is based on the distribution of users performed in step 406. In some implementations, the mapping can be stored in one or more servers other than aggregator servers which can be accessed by various aggregator servers to perform user-to-shard lookups. At step 410, a data store is also created that correlates user, by relationship, such as users having a friend relationship.

At step 412, new users are added to the system. In some implementations, adding a new user is accomplished by adding the user to a shard designated for new users. In some implementations, a new user can be assigned to a shard randomly or can be assigned to a cluster based on factors such as geographic location, browsing history, ethnicity, or other information known about the new user.

At step 414, as relationship information about the user is acquired sufficient to assign the user to a cluster, the user can be deleted from the new user shard and added to the shard holding the data for the users in that cluster.

At step 416, the user-to-shard mappings are updated to reflect the mapping between the new user and the shard storing the data for that new user. Also at step 416, the user relationship data store is updated to indicate what other users are in a friend relationship with the new user. At step 418, the process ends.

Figure 5:
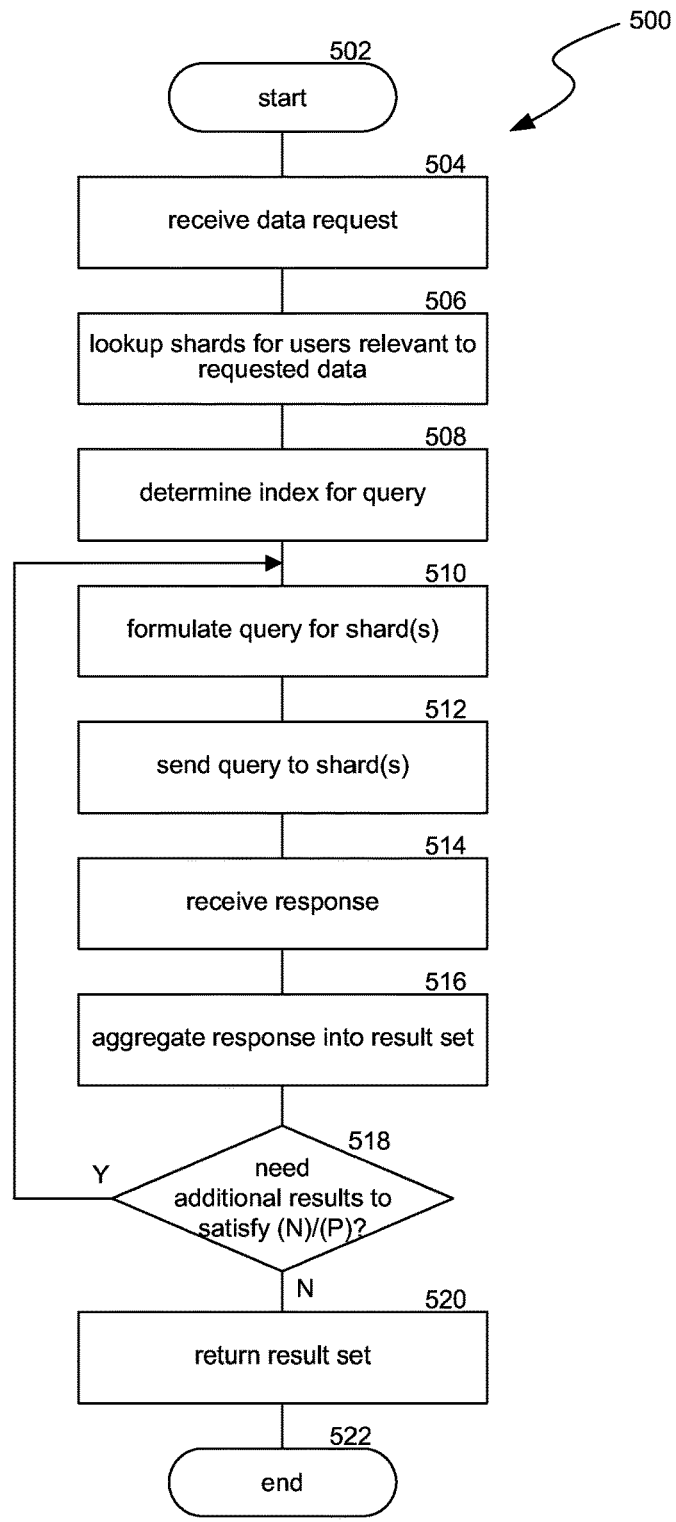
FIG. 5 is a flow diagram illustrating a process used in some embodiments for responding, by an aggregator tier in a multi-tiered targeted query system, to a data request.

FIG. 5 is a flow diagram illustrating a process 500 used in some embodiments for responding, by an aggregator tier in a multi-tiered targeted query system, to a data request. The process begins at step 502 and continues to step 504. At step 504, the data request is received. The received data request may be for indications of specified user activity by users within a specified category. In some implementations, the specified category may be friends of the specified user or friends-of-friends of the specified user. The specified user activity may be interaction with a particular content item, such as a like operation in relation to the content item. In some implementations, the data request may also include parameters specifying a minimum number (N) and/or percentage (P) of the users in the category. These parameters can be used by the aggregator server to limit the number of shards required to execute queries in relation to the data request. In many cases, users can be distributed among shards to maximize densities of users in the same friend relationships on the same shard. Thus, the majority of a particular user's friends may all be on one shard, while the remainder of the friends of that user are spread across several shards. If servicing a data request requires checking all of a user's friends or friends-of-friends, a majority of these friends can be checked by querying only a few shards. However, checking all of the user's friends or friends-of-friends may increase by several multiples the number of shards that must be queried. Thus, by using (N) and/or (P) parameters to indicate an amount that is less than all the users in the identified relationship with the identified user who must be checked to complete the data request, a significant number of queries can be eliminated, even though a large majority of a user's friends or friends-of-friends are still checked. After receiving a data request, the process continues to step 506.

At step 506, the process looks up shards for users relevant to the requested data. This may, for example, include selecting the shards storing data for users in the category of users identified in the data request. By selecting the shards with the relevant user data prior to sending the queries to the shards, the aggregator level is able to prevent unnecessary fan-out. There may be only one or there may be multiple selected shards. In some implementations, determining the relevant shards is a two-step process comprising 1) looking up users in the identified relationship and 2) looking up the shards storing data for the users identified in step 1. Looking up users in the identified relationship can be performed by querying a data store with a record of relationships between users. A copy of this data store can be stored on each aggregator server for local lookups, or can be stored on one or more other servers which can be queried by aggregator servers to make this determination. Once the users who are in the category specified in the data query are determined, the aggregator server can look up shards that store data for these users. This can be performed using a mapping of users to shards. A copy of this mapping can be stored on each aggregator server for local lookups, or can be stored on one or more other servers which can be queried by aggregator servers to make this determination. In some implementations, where the data request specifies (N) and (P) parameters, determining the shards storing information for the users in the specified category may further comprise determining an order of these shards. This order can be used to select shards to which queries should be sent such that efficacy of each query is maximized in relation to fulfilling the (N) and (P) parameters. In some implementations, this ordering can be based on the number of users in the identified category corresponding to each shard. In some implementations, this ordering can be based on a weight assigned to how strongly each user within the identified category fits in that category. For example, where the category is friends or friends-of-friends of a particular user, a weight can be assigned to the relationship between that user and each friend of that user defining an estimation of the level of that relationship. Such an estimation can be based on factors such as how many friends the users have in common, how much the users interact, the similarity of the content with which the users interact, and data about the user such as geographical and biographical information. Once the relevant shards are selected, the process continues to step 508.

At step 508, an index is selected to use in querying the individual shards. In some implementations, this index is selected individually for each shard, while in other implementations, the index is selected for use in all queries executed to fulfill the data request. In some implementations, each shard is configured to have one or more of user-to-data and data-to-user indices. A user-to-data index can correlate, for each user, what content items that user has performed a particular operations for, such as a like operation. In some implementations, each shard can also or instead have a data-to-user index. A data-to-user index can correlate, for each content item, which users have performed a particular operation, such as a like operation, for that content item. The process then continues to step 510.

At step 510, the process formulates a query for one or more of the shards selected in step 506. In some implementations, this may comprise using a version of the data request. For example, the data request may amount to "find the friends of user X who liked content C," and the formulated query may be "find the users on this shard who are in group G (previously determined to be the friends of X) and who liked content C." In some implementations, queries can be customized for one or more particular shards. For example, where a data request amounts to "find the friends of user X who liked content C," the query formulated for shard S may amount to "of users A, B, and C (the users previously found to be friends of X with data stored by shard S), find the users who performed a like operation in relation to content C." In some implementations, the queries can be based on (N) and/or (P) parameters. For example, instead of requiring a shard to check every friend of user X on shard S, because parameter (N) specifies 100 users and shard S has data for 200 friends of user X, the query may indicate that only the first 100 of these friends of user X must be checked by shard S for having performed the identified action.

At step 512, the query formulated in step 510 is sent to one or more of the shards selected in step 506. In some implementations, the queries generated in step 506 are sent to each of their corresponding shards in one burst. In other implementations, such as where (N) and (P) parameters are used to indicate a minimum number or percentage of users who should meet the criteria in the data request, queries can be sent to the shards identified in step 506 incrementally until the specified (N) and/or (P) parameters are satisfied. In these cases, queries can be sent to shards one at a time, or can be sent to a group of shards at once based on an expectation that queries on this group of shards are likely, beyond a particular threshold level, to satisfy the (N) and/or (P) parameters. In cases where an (N) and/or (P) parameter are specified, the order in which queries are sent and the groupings of shards can be based on the order of shards established in step 506. These orders can be established by the number of users for which a shard stores data relating to the users in the category specified in the data request or by the sum weight associated with the users for which a shard stores data relating to the users in the category specified in the data request.

At step 514, one or more responses are received from shards that received queries as a result of step 512. At step 516, the received responses are aggregated together and are aggregated with any previously received responses for this data request.

Step 518 may be implemented where (N) and (P) parameters are used to indicate a minimum number or percentage of users who should meet the criteria in the data request. At step 518, the process determines whether the (N) and (P) parameters are satisfied. In some implementations, the (N) and (P) parameters are satisfied when either the (N) or (P) parameter is satisfied, while in other implementations, the (N) and (P) parameters are satisfied when both the (N) and (P) parameters are satisfied. In some implementations only one of the (N) or (P) parameters may be specified in the data request. Determining that the (N) parameter is satisfied, in implementations where the parameters indicate a minimum amount of users who should satisfy the criteria, comprises determining that the number of users found that satisfy the data request criteria is at least equal to the value indicated by the (N) parameter. Determining that the (P) parameter is satisfied, in implementations where the parameters indicate a minimum amount of users who should satisfy the criteria, comprises determining that, of the users in the category indicated in the data request, the percentage of those users who have been found to satisfy the data request criteria is at least equal to the value indicated by the (P) parameter. The (N) or (P) parameters may also be determined to be satisfied when all of the users in the category indicated in the data request have been checked. If the (N) and (P) parameters are satisfied, or if this is an implementation that does not use (N) or (P) parameters, the process continues to step 520. If the (N) or (P) parameters are specified and the (N) and (P) parameters are not satisfied process continues to accumulate additional shard responses until the parameters are satisfied. As shown, this can include returning to step 510, while in some implementations the query creation process can be completed for all shards already, and so the process would return to step 512 instead.

At step 520, the aggregated result set is used to reply to the data request. In some implementations, additional processing may also occur to respond to the query, such as obtaining, either as part of the initial query or as a subsequent query after receiving the user identifiers, one or more requested attributes of the identified users. The process then continues to step 522, where it ends.

Figure 6:
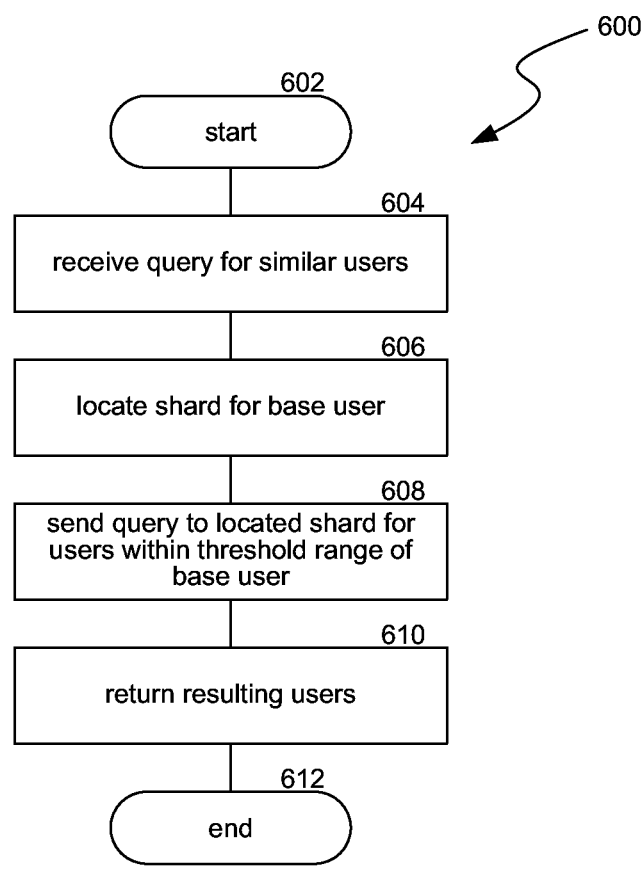
FIG. 6 is a flow diagram illustrating a process used in some embodiments for responding, by an aggregator tier in a multi-tiered targeted query system, to a request for similar users.

FIG. 6 is a flow diagram illustrating a process 600 used in some embodiments for responding, by an aggregator tier in a multi-tiered targeted query system, to a request for similar users. As discussed above, user data within each shard can be organized according to similarity between users. In this environment, queries requesting a number of users similar to an indicated user can be serviced by selecting, within a shard, the users with data near the data of the indicated user. The process begins at step 602 and continues to step 604. At step 604, the process receives a query for a number users similar to an identified user. The number of users can be specified in the query or can be a default value.

At step 606, the shard storing the data for the user identified in the query is selected. This can be performed using a mapping of users to shards. A copy of this mapping can be stored on each aggregator server for local lookups, or can be stored on one or more other servers which can be queried by aggregator servers to make this determination.

At step 608, a query is sent to the selected shard requesting identifiers for an amount of users in the shard before the identified user and for the amount of users in the shard after the identified user. The amount can be one-half the number of users specified in the query or of a default number.

At step 610, results of the query are received and are returned as a response to the query for similar users. The process then continues to step 612, where it ends.

Several embodiments of the disclosed technology are described above in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but that various modifications can be made without deviating from the scope of the embodiments and implementations. The specific features and acts described above are disclosed as example forms of implementing the claims that follow. Accordingly, the embodiments and implementations are not limited except as by the appended claims.

We claim:

1. A method for targeted database querying based on an established distribution of user activity data, comprising:

receiving, by a first server device, a request for specified user activity data, the request specifying a criterion for identifying users from which to select the user activity data and including a parameter indicating a numerical amount of users less than all users matching the criterion;

determining, by a second server device, a category of users matching the criterion;

determining, by the second server device and from among a set of multiple computing systems storing data associated with multiple users, a subset of the computing systems that store data for the category of users matching the criterion, wherein the determining includes:

storing the data for different users in the category of users at different computing systems; and selecting, by the second server device, at least two of the subset of the computing systems based on at least the parameter such that the selected at least two of the subset of the computing systems includes data for enough users to satisfy the numerical amount indicated by the parameter, wherein the selected subset of the computing systems comprises less than all of the computing systems within the set of computing systems that are associated with users in the specified category;

formulating, by the second server device, a query to be used by the selected subset of the computing systems to retrieve the specified user activity data;

sending, by the second server device and to the at least two of the selected subset of the computing systems, the formulated query;

receiving, by the second server device, a response from the at least two of the subset of the computing systems;

aggregating, by the second server device, into a result set the received responses from the at least two of the subset of the computing system; and responding, by the first server device, to the request for specified user activity data by providing the result set.

2. The method of claim 1 wherein the category of users comprises at least one of: friends or friends-of-friends of one or more specified users.

3. The method of claim 1 wherein selecting the subset of the computing systems comprises:

performing an initial query to determine identifiers for the users in the category of users; and performing a subsequent query to determine the subset of the computing systems by selecting the computing systems from among the multiple computing systems that are identified in the established distribution of user activity data as storing data for the users having the determined identifiers.

4. The method of claim 3 wherein at least one of the initial query and the subsequent query are performed locally.

5. The method of claim 1 wherein the query is a first query, the method further comprising formulating a second query, different from the first query, to be used to retrieve the specified user activity data by at least one of the selected subset of the computing systems other than the one or more of the selected subset of the computing systems.

6. The method of claim 5 wherein the second query is configured to be used by the at least one of the selected subset of the computing systems by specifying, within the second query, the users in the category of users that are designated in the established data distribution as having data including at least one of the selected subset of the computing systems.

7. The method of claim 1 wherein formulating the query comprises selecting a user-to-data index to use when executing the query.

8. The method of claim 1 wherein formulating the query comprises selecting a data-to-user index to use when executing the query.

9. The method of claim 1 wherein:

the parameter indicating the numerical amount of users less than all users matching the criterion comprises:

a parameter indicating a number of users in the category of users to check for having the specified user activity data; or a parameter indicating a percentage of users in the category of users to check for having the specified user activity data;

selecting, by the second server device, the at least two of the subset of the computing systems comprises selecting the subset based on:

each selected computing system in the subset being higher in an ordering of the computing systems in the set of multiple computing systems than one or more computing systems of the set of computing systems that are not selected for the subset; and a determination that checking the sum of the users in the specified category associated with all the computing systems in the selected subset would satisfy the parameter indicating the number of users to check or the parameter indicating the percentage of users to check; and the ordering is arranged by a value assigned to each computing system indicating a priority for that computing system, wherein each priority is based on the set of users within the specified category associated with that computing system.

10. The method of claim 9 wherein the priority of each computing system is based on a total count of the set of users within the specified category associated with that computing system.

11. The method of claim 9:

wherein a weight is assigned to each user within the specified category indicating how strongly that user is within the specified category; and wherein the priority of each computing system is based on a sum of the weights for the users within the specified category associated with that computing system.

12. The method of claim 1 wherein two or more of the computing systems in the set of multiple computing systems are databases implemented on a single server.

13. A computer-readable memory storing instructions configured to, when executed by a computing system, cause the computing system to perform operations for targeted database querying based on an established distribution of user activity data, the operations comprising:

receiving, by a first server device, a request for specified user activity data, the request specifying a criterion for identifying users from which to select the user activity data and including a parameter indicating a numerical amount of users less than all users matching the criterion;

determining, by a second server device, a category of users matching the criterion;

determining, by the second server device and from among a set of multiple computing systems storing data associated with multiple users, a subset of the computing systems that store data for the category of users matching the criterion, wherein the determining includes:

storing the data for different users in the category of users at different computing systems; and selecting, by the second server device, at least two of the subset of the computing systems based on at least the parameter such that the selected at least two of the subset of the computing systems includes data for enough users to satisfy the numerical amount indicated by the parameter, wherein the selected subset of the computing systems comprises less than all of the computing systems within the set of computing systems that are associated with users in the specified category;

formulating, by the second server device, a query to be used by the selected subset of the computing systems to retrieve the specified user activity data;

sending, by the second server device and to at least two of the selected subset of the computing systems, the formulated query;

receiving, by the second server device, a response from at least two of the subset of the computing systems;

aggregating, by the second server device, into a result set, the received responses from the at least two of the subset of the computing systems; and responding, by the first server device, to the request for specified user activity data by providing the result set.

14. The computer readable memory of claim 13 wherein the category of users comprises at least one of: friends or friends-of-friends of one or more specified users.

15. The computer readable memory of claim 13 wherein selecting the subset of the computing systems comprises:

performing an initial query to determine identifiers for the users in the category of users; and performing a subsequent query to determine the subset of the computing systems by selecting the computing systems from among the multiple computing systems that are identified in the established distribution of user activity data as storing data for the users having the determined identifiers.

16. The computer readable memory of claim 13 wherein:

the parameter indicating the numerical amount of users less than all users matching the criterion comprises:

a parameter indicating a number of users in the category of users to check for having the specified user activity data; or a parameter indicating a percentage of users in the category of users to check for having the specified user activity data;

selecting, by the second server device, the at least two of the subset of the computing systems comprises selecting the subset based on:

each selected computing system in the subset being higher in an ordering of the computing systems in the set of multiple computing systems than one or more computing systems of the set of computing systems that are not selected for the subset; and a determination that checking the sum of the users in the specified category associated with all the computing systems in the selected subset would satisfy the parameter indicating the number of users to check or the parameter indicating the percentage of users to check; and the ordering is arranged by a value assigned to each computing system indicating a priority for that computing system, wherein each priority is based on the set of users within the specified category associated with that computing system.

17. The computer readable memory of claim 16 wherein the priority of each computing system is based on a total count of the set of users within the specified category associated with that computing system.

18. The computer readable memory of claim 16:

wherein a weight is assigned to each user within the specified category indicating how strongly that user is within the specified category; and wherein the priority of each computing system is based on a sum of the weights for the users within the specified category associated with that computing system.

19. A system for targeted database querying based on an established distribution of user activity data, comprising:

a memory and one or more processors;

a transceiver configured to receive a request for specified user activity data, the request specifying a category of users in which to select the user activity data and including a parameter indicating a numerical amount of users less than all users matching the criterion;

a user relationship data store and lookup engine configured to perform an initial query to determine identifiers for the users in the category of users;

a user-to-shard mapping and lookup engine configured to perform a subsequent query to determine a subset of multiple computing systems by selecting the computing systems from among the multiple computing systems that are identified in the established distribution of user activity data as storing data for the users having the determined identifiers, wherein the selecting includes:

storing the data for different users in the category of users at different computing systems, wherein the user-to-shard mapping and lookup engine is configured to select at least two of the subset of the computing systems based on at least the parameter such that the selected at least two of the subset of the computing systems includes data for enough users to satisfy the numerical amount indicated by the parameter, wherein the selected subset of the computing systems comprises less than all of the computing systems within the set of computing systems that are associated with users in the specified category;

a query generator configured to formulate a query to be used by at least two of the selected subset of the computing systems to retrieve the specified user activity data;

wherein the transceiver is further configured to:

send, to the at least two of the selected subset of the computing systems, the formulated query; and receive a response from at least two of the subset of the computing systems; and a response aggregator configured to aggregate, into a result set, the received responses from the at least two of the subset of the computing systems;

wherein the result set is used to respond to the request for specified user activity.

20. The system of claim 19 wherein the category of users comprises at least one of: friends or friends-of-friends of one or more specified users.

* * * * *